J. Wertsbaugher.
Locking-Knob Latch.
N° 72347     Patented Dec. 17, 1867
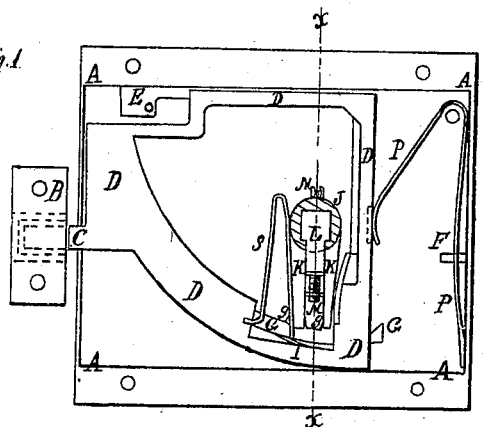
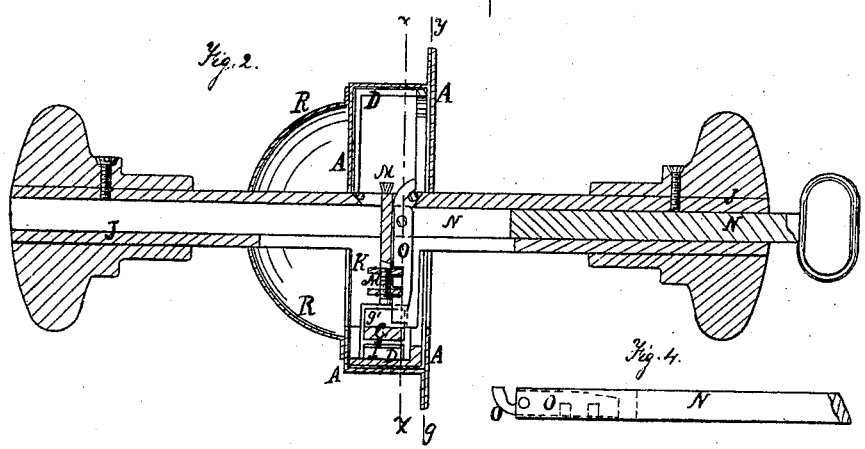
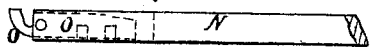
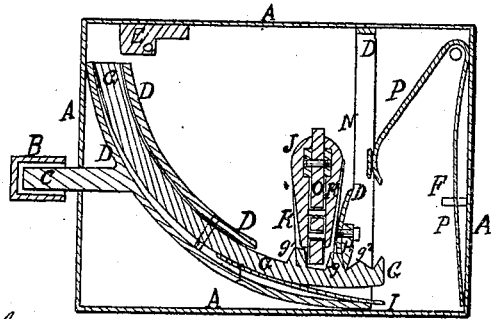
Witnesses
Thos Tusche
Wm Dean Overell
Inventor
J Wertsbaugher
Per Munn & Co
Attorneys

United States Patent Office.

JACOB WERTSBAUGHER, OF LA GRANGE, INDIANA.

Letters Patent No. 72,347, dated December 17, 1867.

IMPROVEMENT IN LOCKING-KNOB LATCH FOR DOORS.

*The Schedule referred to in these Letters Patent and making part of the same.*

TO ALL WHOM IT MAY CONCERN:

Be it known that I, JACOB WERTSBAUGHER, of La Grange, in the county of La Grange, and State of Indiana, have invented a new and improved Lock; and I do hereby declare that the following is a full, clear, and exact description thereof, which will enable those skilled in the art to make and use the same, reference being had to the accompanying drawings, forming part of this specification, in which—

Figure 1 is a side view of my improved lock, the inner plate being removed, partly in section, through the line $y\,y$, fig. 2.

Figure 2 is a detail sectional view of the same, taken through the line $x\,x$, fig. 1.

Figure 3 is a detail sectional view of the same, taken through the line $z\,z$, fig. 2.

Figure 4 is a detail view of the key.

Similar letters of reference indicate corresponding parts.

My invention has for its object to furnish an improved lock, strong, durable, and simple in construction, which cannot be picked, and of which no impression can be taken to enable a false key to be made; and it consists in the construction and combination of the various parts, as hereinafter more fully described.

A is the case or box of the lock, about the construction of which there is nothing new. B is the catch, which is attached to the jamb of the doorway to receive the end of the sliding bolt, to fasten the door shut. C is the bolt, which is simply a projection formed upon or firmly attached to the frame D, which slides back and forth within the case A, and the movement of which is limited by the stops E and F, attached to the said case. The stop E also acts as a stop or support for the end of the dog or tumbler, to prevent the frame D from being moved back when locked. In the curved part of the frame D is formed a circular or curved recess or chamber, for the reception of the curved dog G, which moves back and forth through said recess as it is operated by the key. $g^1$ are two projections, formed upon the inner or concave side of the rear end of the dog G, between which the key enters, and against which it acts in moving the said bolt back and forth. $g^2$ is a projection, having inclined sides, which moves back and forth along the stop-plate H, to regulate the throw of the dog G. The stop-plate H is secured to the frame D by a screw, so that it may be removed or adjusted when required. I is a spring, attached to the outer or convex side of the dog G, and the free end of which presses against and slides along the outer side of the chamber or recess in which the said dog G works. The spring I holds the dog G forward against the key, and also against the stop-plate H, while the said dog is being operated by the said key. J is a hollow stem or tube, which passes through the lock, and which has an arm or projection, K, formed upon it within the case A. The arm K is slotted longitudinally, said slot being extended up upon the hollow stem J, upon the side of the said stem, upon which the said arm is formed, as shown in fig. 2. The projecting end of the slotted arm K is notched transversely, to enable it to pass over the projections $g^1$ of the dog G, while at the same time it projects far enough to act upon and move the frame D back and forth, in opening and shutting the door. L is a plate, fitting into a groove formed in the sides of the slot in the arm K, at the centre of said arm, and having a guard formed upon or attached to its inner end, and projecting upon both sides of the said plate L. M is a screw, passing longitudinally through the plate L, and having a ward swivelled to its forward end, so that by turning the said screw the relative positions of the two wards may be shifted, as desired, to adjust them to the wards of the key, or so that the ordinary key will not operate the lock. N is the shank of the key, which fits into the hollow of the stem J, and the lower end of which is slotted, for the reception of the trigger or trip-bar O. The short end of the bar O is made inclined, or is rounded off, and has a notch formed upon it. Upon the edge of the long arm of the bar O are formed notches or wards, into which the wards of the plate L enter, to allow the bar O to drop down between the projections $g^1$ of the dog G, to operate said bolt. P is the main-spring of the lock, which is placed between the rear end of the frame D and the rear end of the case A, to press the said frame D forward. S is a bent spring, one end of which rests against the frame D, and the other end against the arm K of the hollow stem J, to force the said stem back into its position when released. R is a convex or bowl-shaped plate, through which the hollow stem J passes, and which is attached to the side of the lock or door, to cover and protect the slot through which the trip-bar O acts.

In locking the lock, as the key N O is passed into the hollow stem J, the inclined end of the short arm of the trip-bar O strikes the plate L, and the bar is thrown forward upon the guards of said plate L, and between the projections $g^1$ of the dog G; then, by turning the key and knob towards the bolt C, the dog G will be forced forward or locked, and by drawing the key slightly outward, so as to free the bar O from the dog G, and allowing the knob to spring back to its place, the key can be withdrawn. To unlock the lock, insert the key, and turn the key and knob towards the bolt C, and then push the key inward, to cause the bar O to enter between the projections $g^1$ of the dog G; then, by turning the key and knob back, the dog G will be withdrawn, and the lock unlocked.

My invention has been described as being applied to a door-lock, but it can be applied with equal advantage and facility to various other kinds of locks.

I claim as new, and desire to secure by Letters Patent—

1. The curved dog G, constructed substantially as herein shown and described, in combination with the sliding frame D, as and for the purpose set forth.

2. The hollow stem or tube J, having a slotted arm, K, attached to or formed upon it, substantially as herein shown and described, and for the purpose set forth.

3. The combination of the plate L, with its adjustable ward or wards, with the hollow stem J and slotted arm K, substantially as herein shown and described, and for the purpose set forth.

JACOB WERTSBAUGHER.

Witnesses:
    JOHN D. DEVOR,
    THOS. S. TAYLOR.